United States Patent

Koenck et al.

[11] Patent Number: 5,818,553
[45] Date of Patent: Oct. 6, 1998

[54] CONTRAST CONTROL FOR A BACKLIT LCD

[75] Inventors: Steven E. Koenck, Cedar Rapids; William Henry Keehn, II, Marion, both of Iowa

[73] Assignee: Norand Corporation, Cedar Rapids, Iowa

[21] Appl. No.: 944,720

[22] Filed: Oct. 6, 1997

Related U.S. Application Data

[63] Continuation of Ser. No. 419,996, Apr. 10, 1995, abandoned.

[51] Int. Cl.⁶ ............................ G02F 1/1335; G09G 3/36
[52] U.S. Cl. ............................... 349/61; 349/69; 345/102
[58] Field of Search ................................. 359/48, 72, 84, 359/85; 250/201.1, 205, 214 AL; 349/116, 199, 61, 62, 63, 64, 65, 66, 67, 68, 69, 70, 71, 16, 85, 104; 345/102, 207, 147

[56] References Cited

U.S. PATENT DOCUMENTS

| | | | |
|---|---|---|---|
| 4,888,599 | 12/1989 | Harwood et al. | 345/89 |
| 4,920,257 | 4/1990 | Fuerthbauer et al. | 359/36 |
| 5,302,815 | 4/1994 | Eggenschwiler | 359/66 |
| 5,327,263 | 7/1994 | Katagiri et al. | 359/72 |

OTHER PUBLICATIONS

Author—Unknown; Title—"A better option for processing light levels"; Date—Spring, 1994 p.–5; Place of Publication—Texas Instruments.

*Primary Examiner*—William L. Sikes
*Assistant Examiner*—Walter Malinowski
*Attorney, Agent, or Firm*—Suiter & Associates PC

[57] ABSTRACT

A contrast controller for a liquid-crystal display maximizes the display contrast by using a light sensor to detect ambient light levels and light blocked by the LCD panel. The display contrast is maximized by maximizing the difference between the ambient and blocked light levels. Further contrast maximization is accomplished through variable control of the LCD backlight in accordance with sensed light levels.

12 Claims, 2 Drawing Sheets

CONTRAST CONTROL FOR A BACKLIT LCD

The present application is a continuation of U.S. application Ser. No. 08/419,996 filed Apr. 10, 1995, now abandoned.

TECHNICAL FIELD

The invention relates generally to liquid-crystal displays (LCD) and particularly to controlling the contrast of a liquid-crystal display.

BACKGROUND OF THE INVENTION

Liquid-crystal displays (LCDs) have come into common use in portable electronic devices. The quality of LCD displays has drastically improved in recent years which, coupled with their low current requirements is a reason for the widespread application of LCDs in battery operated electronic devices. One of the main concerns of using LCDs however is the washout effect on the display caused ambient lighting which reduces display contrast. Contrast in a liquid-crystal display is the difference between the brightest and darkest display components.

Contrast of the liquid-crystal display directly affects the readability of the display output. Frequently an LCD display is utilized in a battery powered portable electronic device intended to be used in a variety of operating environments having widely varying levels of ambient light. Ideally, the display of a portable electronic device must be readable over an intensity of ambient light ranging from almost complete darkness to direct sunlight. It is thus desirable to have a liquid-crystal display which automatically adjusts display contrast and readability in accordance with changing ambient lighting conditions while maximizing performance and minimizing battery consumption. The more closely the display follows changing lighting conditions, the more efficient the display will be, and the more productive the operator will be.

SUMMARY OF THE INVENTION

The object of the invention is to provide a variable LCD contrast control in order to maximize display contrast.

Other principle objects, features and advantages of the invention will become apparent from the following description and accompanying drawings, which set forth by way of illustration and example certain specific embodiments of this invention.

DETAILED DESCRIPTION

Figure 1:
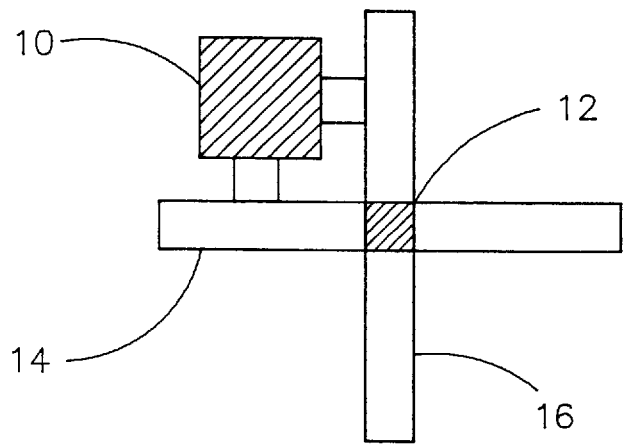
FIG. 1 depicts a sensor pixel electrically connected to a pixel of a liquid-crystal display.

FIG. 1 depicts the electrical arrangement of a sensor pixel of a liquid-crystal display utilizing the present invention. A sensor pixel 10 may be electrically connected to the row driver circuit 14 and the column driver circuit 16 of a display pixel 12 of a liquid-crystal display. The sensor pixel 10 may be relatively larger in area than an individual display pixel 12. The sensor pixel 10 is driven at the same multiplex rate as the pixel 12 of the LCD.

Two light sensor devices (not shown) may detect relative light levels in order to maximize the contrast of the LCD. One light sensor is placed in an optically transmissive (clear) area in order to detect ambient light levels. The other light sensor is placed behind the sensor pixel 10 in order to determine the ability of the sense pixel 10 and hence the pixels of the LCD to block the transmission of light therethrough. The contrast of the LCD may be controlled by maximizing the difference between the readings of the two light sensors. This is accomplished by variably adjusting the contrast control drive circuitry until a maximum contrast is attained as determined by the difference of outputs from the two light sensors.

The light sensors devices may be Texas Instruments TSL230 programmable light sensors. The TSL230 has a pulse train output having a frequency proportional to the intensity of light impinging upon its light sensor. A circuit responsive to the variations in signal frequency may be used to drive the LCD contrast control circuitry. In an exemplary embodiment a system microprocessor may compare the two light sensor outputs and drive the contrast control circuitry of the LCD accordingly.

Figure 2:
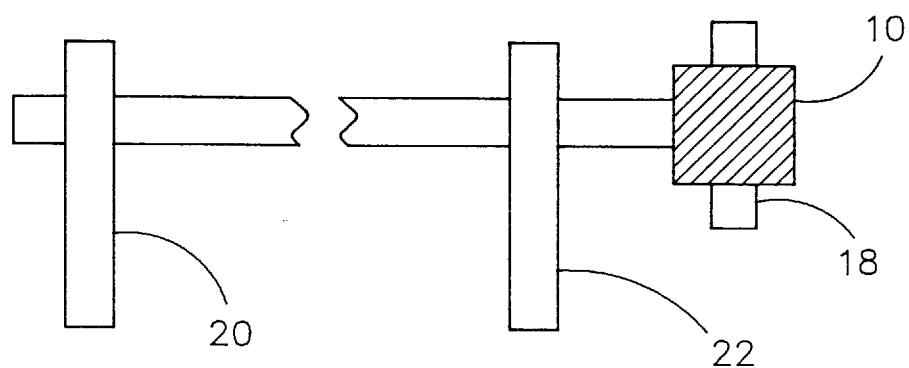
FIG. 2 illustrates a sensor pixel having a drive facility in addition to the drive circuitry of a liquid-crystal display.

FIG. 2 shows a sensor pixel having drive circuitry separate from the drive circuitry of the pixels of a liquid-crystal display. Sensor pixel 10 has its drive facility 18 separate from the driving circuitry of the LCD pixels wherein the first column drive circuit 20 and the last column drive circuit 22 are shown. The sensor pixel 10 may have its own drive facility 18 to drive the sensor pixel 10 at an average of all pixels in the LCD rather than being driven the same as one specific pixel which may not be representative of the rest of the pixels in the LCD. The drive facility 18 of the sensor pixel 10 must drive the sensor pixel 10 and the multiplex method must be identical or nearly identical to the LCD pixels for approximating the performance of the LCD pixels.

Figure 3:
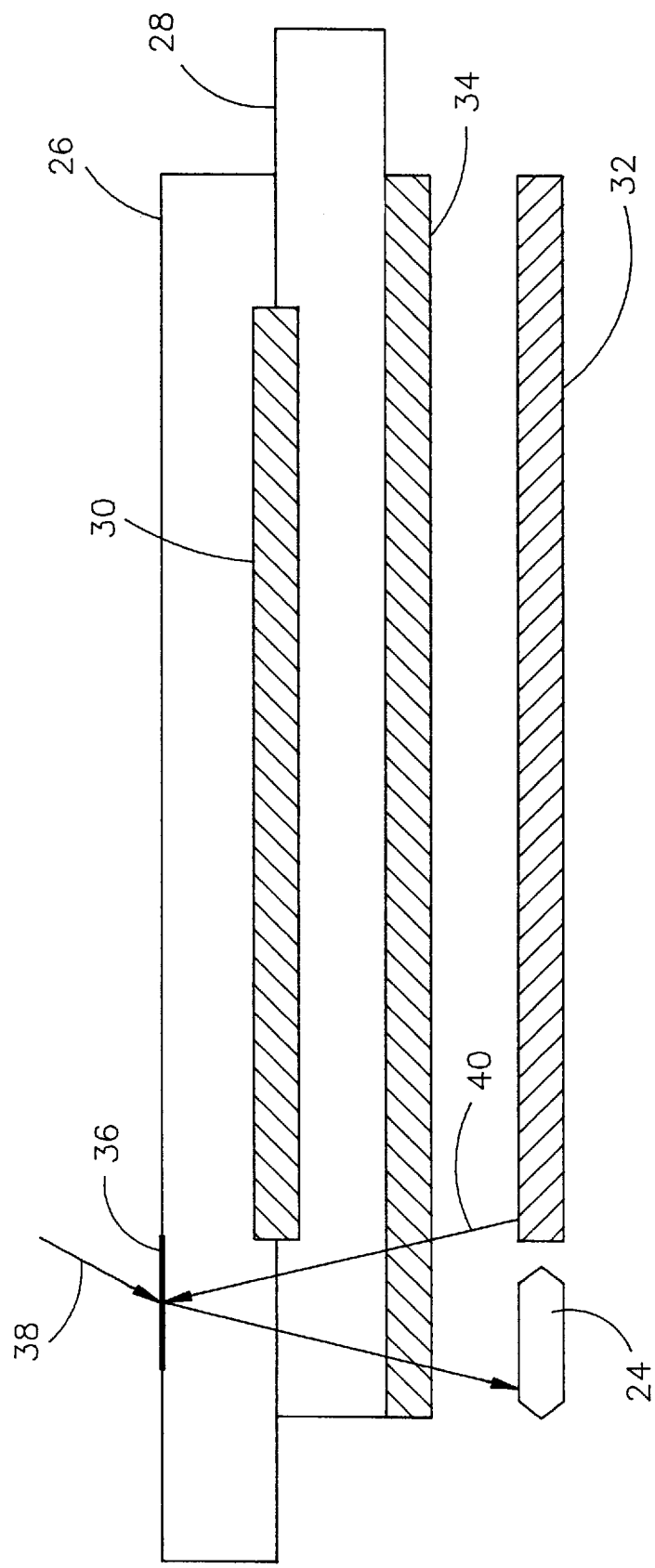
FIG. 3 illustrates an exemplary embodiment of the invention.

FIG. 3 is an illustration of an exemplary embodiment of the present invention. A single light sensor 24 may be placed behind an LCD panel generally having the configuration shown. The LCD panel may be comprised of pixel viewing area 30 sandwiched between glass panels 26 and 28. An electroluminescent panel 32 provides backlighting for the LCD which has half-silvered reflector. Sensor pixel 36 may be placed on the surface of glass panel 26 which itself may be protected by a thin clear coating, not shown. The light sensor 24 may detect ambient light 38 directly impinging thereupon when sensor pixel 36 allows light to be transmitted therethrough. The light sensor 24 may also detect light 40 emitted from electroluminescent panel 32 after such light 40 passes through the half-silvered layer 34 and is reflected off of the sensor pixel 36. The contrast of the LCD panel may be controlled by adjusting the backlighting level until a maximum difference between the ambient light level and the blocked light level is reached.

The multiplexing of the drive signal to sensor pixel 36 causes light sensor device 24 to alternately receive ambient 38 and light 40 emitted from electroluminescent panel 32. As discussed in the description of FIG. 1, an electronic circuit or microprocessor 42 may receive the output signal from light sensor 24 to vary the contrast control circuitry of the LCD so that the difference in output signals is maximized thereby maximizing display contrast. Further, the drive signal to electroluminescent panel 32 may also be varied in achieving maximum display contrast.

It will be apparent that many modifications and variations may be effected without departing from the teachings and concepts of the present disclosure.

What is claimed is:

1. A contrast controller for a liquid-crystal display, comprising:
   (a) at least one light sensor for detecting varying levels of light impinging thereupon and producing a varying electrical output related to the varying levels of light;
   (b) a sensor pixel positioned between the impinging light and said at least one light sensor for controlling the light impinged upon said at least one light sensor proportional to the amount of light transmitted through the liquid-crystal display, wherein the impinging light includes light from a backlighting device of the liquid-crystal display; and
   (c) contrast maximizing means responsive to the varying electrical output of said at least one light sensor for maximizing the contrast of the liquid-crystal display.

2. The contrast controller of claim 1 wherein said sensor pixel is a pixel of said liquid-crystal display.

3. The contrast controller of claim 1 wherein said sensor pixel is electrically driven by the drive circuitry of the liquid-crystal display.

4. The contrast controller of claim 1 wherein said sensor pixel is electrically driven at a rate equivalent to the average drive rate of the liquid-crystal display.

5. A method for controlling the contrast of a liquid-crystal display comprising:
   (a) detecting the level of light incident upon the liquid-crystal display including light produced by a backlighting device of the liquid-crystal display;
   (b) detecting the level of light transmitted through the liquid-crystal display; and
   (c) adjusting the contrast of the liquid-crystal display until a maximum difference between the incident light level and the transmitted light level is reached.

6. The method according to claim 5 further including the step of adjusting the backlighting level of the liquid-crystal display until a maximum difference between the incident light level and the transmitted light level is reached.

7. An apparatus for controlling the contrast of a liquid-crystal display, comprising:
   a driver circuit for electrically driving the liquid-crystal display;
   a sensor pixel being electrically connected to said driver circuit;
   a first light sensor being disposed relative to the liquid-crystal display to detect ambient light directly impinging thereupon including light produced by a backlighting device of the liquid-crystal display, said first light sensor providing an output proportional to the ambient light; and
   a second light sensor being disposed relative to said sensor pixel to detect light transmitted therethrough, said second light sensor providing an output proportional light transmitted through said sensor pixel wherein said driver circuit adjusts the contrast according the outputs from said first and said second light sensors.

8. An apparatus as claimed in claim 1, wherein said sensor pixel is a pixel of the liquid-crystal display.

9. An apparatus as claimed in claim 1, wherein said sensor pixel is driven by said driver circuit.

10. An apparatus as claimed in claim 7, wherein said sensor pixel is driven at a rate equivalent to the average drive rate of the liquid-crystal display.

11. An apparatus as claimed in claim 7, wherein the contrast of the liquid-crystal display is controlled by maximizing the difference between the outputs of said first and said second light sensors.

12. An apparatus as claimed in claim 7, wherein the contrast of the liquid-crystal display is maximized as a function of the difference of the outputs of said first and said second light sensors.

* * * * *